UNITED STATES PATENT OFFICE.

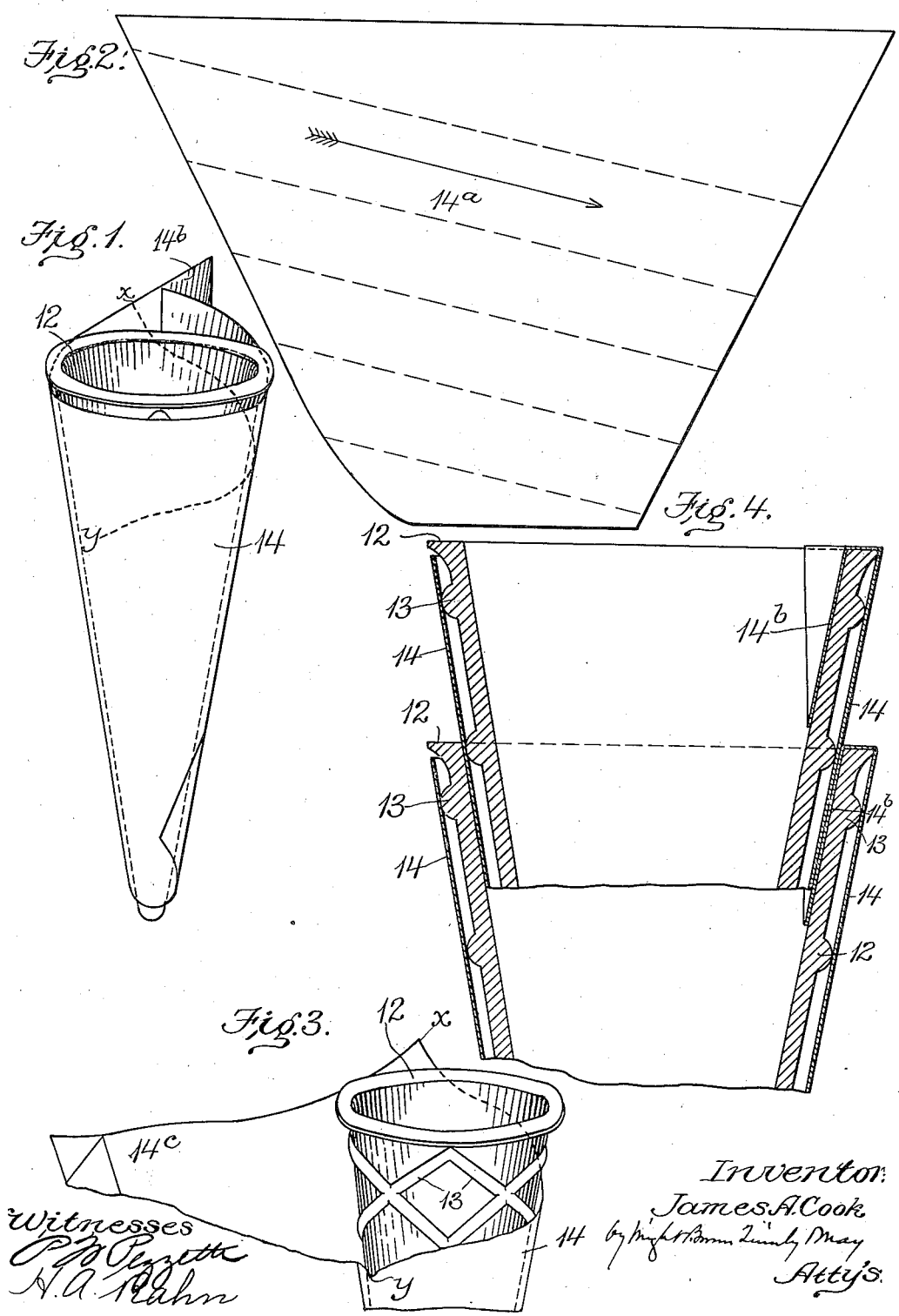

JAMES A. COOK, OF EAST BRIDGEWATER, MASSACHUSETTS.

ICE-CREAM CONE AND PROTECTOR THEREFOR.

1,094,427. Specification of Letters Patent. Patented Apr. 28, 1914.

Application filed June 26, 1913. Serial No. 775,898.

*To all whom it may concern:*

Be it known that I, JAMES A. COOK, a citizen of the United States, and a resident of East Bridgewater, in the county of Plymouth and State of Massachusetts, have invented certain new and useful Improvements in Ice-Cream Cones and Protectors Therefor, of which the following is a specification.

This invention relates to edible cones used to hold portions of ice cream while the same is being eaten, the cone being eatable with its contents.

The invention has for its object to provide a sanitary cone protector to protect the entire external surface of the cone so that the fingers of the party who fills the cone, as well as those of the party who consumes it, cannot touch the cone, and further, so that the cone when in storage is protected to a considerable extent against dampness and kept in a crisp brittle condition, and protected to a large extent against flies when displayed for sale, the nature of the protecting medium being such that it does not interfere with the convenient consumption of the cone and its contents.

The invention consists in the improvements which I will now proceed to describe and claim.

Of the accompanying drawings: Figure 1 represents a perspective view of a protected ice cream cone embodying my invention. Fig. 2 represents a plan view of the blank from which the cone protector is made. Fig. 3 represents a view similar to a portion of Fig. 1, showing the protector partly torn away. Fig. 4 represents an enlarged sectional view of the upper end portions of two protected cones nested together for storage and shipment.

The same reference characters indicate the same parts in all the figures.

In the drawings 12 represents an edible ice cream cone which is preferably provided with ribs 13 on its external surface.

14 represents a protector made from a blank $14^a$ of thin waterproof paper. Said blank is preferably of trapezoidal form and may be made of ordinary paraffin or wax paper. One of the inclined edges of the blank is caused to overlap the other inclined edge, and the contacting portions are cemented together to form a substantially conical protector. I prefer, however, to leave the smaller end of the protector open so that dust or other matter may be forced through the smaller end.

The protector 14 is formed to cover the cone 13 substantially from end to end, so that the exterior of the cone is protected against contact with the fingers of a person handling it, the protector bearing against the ribs 13, as shown by Fig. 4, and being adapted to be pressed inwardly into the spaces between said ribs.

The operation of bending the blank $14^a$ causes the longer of the two parallel edges to form a mouth which is inclined relatively to the longitudinal center of the protector, one side of said mouth being extended to form a flexible lip or extension $14^b$, adapted to project above the mouth of the cone, as shown by Fig. 1. Said extension is also adapted to be bent inwardly over the edge of the cone 12 so that when protected cones are nested as shown by Fig. 4, the extension $14^b$ forms a part of a protective packing between two cones, and also serves to prevent the conical protector, of which it forms a part, from being separated from the accompanying cone 12 by the operation of pulling the nested cones apart.

Before the cone is filled, the extension $14^b$ is returned to the position shown by Fig. 1, and serves as a tearing handle by which the consumer may commence the operation of tearing away the protector spirally to expose different portions of the cone for consumption. I have discovered that when the protector is adjusted as shown by Fig. 1, the consumer can easily tear the protector spirally from end to end by grasping the extension $14^b$ and tearing the protector from the point $x$ to and beyond the point $y$ until the protector is converted into a spiral ribbon, there being little or no liability of tearing the protector into separate pieces, or in other words, of entirely detaching from the protector the tongue $14^c$ (Fig. 3) formed at the commencement of the tearing operation. This tendency of the protector to tear spirally may be increased by forming the parallel edges of the blank $14^a$ at an angle to the direction in which the fibers of the paper extend, as indicated by Fig. 2, where the arrow shows the direction of the fibers and therefore the direction of minimum resistance to a tearing strain. The blank may be scored or weakened as indicated by dotted lines, Fig. 2, to facilitate the removal of the protector from the cone.

The protector may be used with a cone having ribs of any form, or without ribs. Any thin paper may be employed whether waterproofed or not, but I prefer waterproof paper because it keeps the cones hard and brittle.

What I claim and desire to secure by Letters Patent is:—

1. A hollow edible cone provided with a conical protector of thin paper covering the cone substantially from end to end and adapted to be torn to successively expose different portions of the cone, said protector having an extension at one side of its larger end adapted to be bent inwardly over the upper end of the cone and to be withdrawn therefrom to serve as a tearing handle.

2. As an article of manufacture a cone protector, composed of a hollow cone of thin paper formed to cover substantially the entire external surface of the cone and adapted to be torn progressively from its larger end downwardly.

3. As an article of manufacture a cone protector, composed of a hollow cone of thin paper formed to cover substantially the entire external surface of the cone and adapted to be torn progressively from its larger end downwardly, said protector having a flexible extension at one side of its larger end.

4. As an article of manufacture a cone protector, composed of a blank of thin paper having a minimum resistance to tearing strain in one direction and formed into a hollow cone, the axis of which is transverse to the direction of said minimum resistance.

In testimony whereof I have affixed my signature, in presence of two witnesses.

JAMES A. COOK.

Witnesses:
C. F. BROWN,
P. W. PEZZETTI.